United States Patent [19]

Amano et al.

[11] Patent Number: 5,130,387
[45] Date of Patent: Jul. 14, 1992

[54] PROCESS FOR PRODUCING VINYL CHLORIDE POLYMER

[75] Inventors: Tadashi Amano, Kawasaki; Shigehiro Hoshida, Ibaraki, both of Japan

[73] Assignee: Shin-Etsu Chemical Co., Ltd., Tokyo, Japan

[21] Appl. No.: 780,579

[22] Filed: Oct. 22, 1991

Related U.S. Application Data

[63] Continuation of Ser. No. 526,501, May 18, 1990, abandoned.

[30] Foreign Application Priority Data

May 22, 1989 [JP] Japan .................. 1-129646

[51] Int. Cl.$^5$ .................. C08F 2/20
[52] U.S. Cl. .................. 526/199; 526/200; 526/201; 526/202; 526/209; 526/322; 526/323.2
[58] Field of Search .......... 526/320, 322, 338, 323.1, 526/323.2, 232, 199, 200, 201, 202, 209

[56] References Cited

U.S. PATENT DOCUMENTS

| | | | |
|---|---|---|---|
| 2,647,101 | 7/1953 | Humphrey | 526/338 |
| 3,230,203 | 1/1966 | Kühne | 526/323.2 |
| 4,340,530 | 7/1982 | Higashiguchi | 524/515 |
| 4,816,539 | 3/1989 | Watanabe | 526/320 |

*Primary Examiner*—Christopher Henderson
*Attorney, Agent, or Firm*—McAulay Fisher Nissen Goldberg & Kiel

[57] ABSTRACT

A process for producing a vinyl chloride polymer for matted moldings which comprises performing the suspension polymerization of vinyl chloride monomer or a mixture of vinyl monomers composed mainly of vinyl chloride in an aqueous medium, said suspension polymerization being performed after the addition of an aqueous dispersion obtained by dispersing a polyfunctional monomer having 2 or more ethylenic double bonds in the molecule into an aqueous solution of a water-soluble partially saponified polyvinyl alcohol, a water-soluble cellulose eter or an emulsifier, thereby yielding a vinyl chloride resin composed of 5 to 90 wt % tetrahydrofuran-insoluble gel fraction, with the remainder being tetrahydrofuran-solubles.

4 Claims, No Drawings

PROCESS FOR PRODUCING VINYL CHLORIDE POLYMER

This is a continuation of application Ser. No. 526,501, filed May 18, 1990, now abandoned.

BACKGROUND OF THE INVENTION

1. Field of the Invention

The present invention relates to a process for producing a vinyl chloride polymer for matted moldings by suspension polymerization. More particularly, it is concerned with a process for producing a vinyl chloride polymer as a molding material suitable for high-quality matted products, said process being possible owing to the improvement in the method of charging a polyfunctional monomer.

2. Description of the Prior Art

It is known that the production of a vinyl chloride polymer for matted moldings by suspension polymerization in an aqueous medium is accomplished by the addition of a cross-linking agent which is a polyfunctional monomer having 2 or more ethylenic double bonds in the molecule. The charging of such a polyfunctional monomer into the suspension system may be made batchwise before polymerization or intermittently or continuously during polymerization. In either cases, the polyfunctional monomer is added as such or after dilution with a solvent such as toluene, benzene and the like, for the control of insoluble gel content.

The conventional process mentioned above, however, gives rise to a vinyl chloride polymer for matted moldings which contains a large number of fish-eyes.

With the recent expansion of their applications, there has arisen a strict requirement for the quality of vinyl chloride polymers for matted moldings. It is desirable that the vinyl chloride polymer for film and sheet should contain as few fish-eyes as possible.

SUMMARY OF THE INVENTION

The present invention was completed to meet the above-mentioned requirements. Accordingly, it is an object of the present invention to provide a process for producing a vinyl chloride polymer for high-quality matted moldings with a minimum of fish-eyes.

To achieve this object, the present inventors carried out a series of researches which led to the finding that it is possible to produce a vinyl chloride polymer for matted moldings with a minimum of fish-eyes by the process which comprises performing the suspension polymerization of vinyl chloride monomer or a mixture of vinyl monomers composed mainly of vinyl chloride in an aqueous medium, said suspension polymerization being performed after the addition of an aqueous dispersion obtained by dispersing a polyfunctional monomer having 2 or more ethylenic double bonds in the molecule into an aqueous solution of at least one member selected from the group consisting of water-soluble partially saponified polyvinyl alcohols water-soluble cellulose eters and emulsifiers, thereby yielding a vinyl chloride resin composed of 5 to 90% by weight of tetrahydrofuran-insoluble gel fraction, with the remainder being tetrahydrofuran-solubles.

The results of the present inventors' investigation revealed that the vinyl chloride polymer for matted moldings obtained by the conventional process mentioned above contains a large number of fish-eyes because the polyfunctional monomer as a crosslinking agent is charged as such or after dilution with a solvent such as toluene, benzene and the like and hence it does not disperse well into the suspension system. To achieve the improved dispersion of the polyfunctional monomer into the suspension system, the present inventors continued their investigation, which led to the finding that the polyfunctional monomer can be dispersed uniformly into the polymerization system if it is charged into the system in the form of an aqueous dispersion in an aqueous solution containing one or more of water-soluble partially saponified polyvinyl alcohols, water soluble cellulose eters and emulsifiers, and that the polyfunctional monomer charged in this manner brings about the uniform crosslinking reaction, giving rise to a vinyl chloride polymer for matted moldings containing a minimum of fish-eyes. The present invention was completed on the basis of this finding.

Incidentally, the term "tetrahydrofuran-insoluble gel fraction" means the gel fraction insoluble in tetrahydrofuran which is measured by the method given in Example explained later. The term "tetrahydrofuran-solubles" means any remaining fraction which is soluble in tetrahydrofuran.

DETAILED DESCRIPTION OF THE INVENTION

According to the process of the present invention, a vinyl chloride polymer for matted moldings is produced by suspension polymerization in an aqueous medium from a vinyl chloride monomer or a mixture of vinyl monomers composed mainly of vinyl chloride and a polyfunctional monomer having 2 or more ethylenic double bonds in the molecule, said polyfunctional monomer being added in the form of an aqueous dispersion obtained by dispersing said polyfunctional monomer into an aqueous solution of at least one member selected from the group consisting of water-soluble partially saponified polyvinyl alcohols, water-soluble cellulose eters and emulsifiers.

The partially saponified polyvinyl alcohol should be water-soluble and generally has a degree of saponification of 70 to 90 mole %, preferably 75 to 85 mole %. Although the molecular weight of the partially saponified polyvinyl alcohol is not limited, the average degree of polymerization of the partially saponified polyvinyl alcohol may be in the range of 400 to 2500, preferably 800 to 2000.

The water-soluble cellulose eter is one which is used for the conventional polymerization of vinyl chloride and includes methyl cellulose, hydroxyethyl cellullose, hydroxypropyl cellulose, hydroxypropyl methyl cellulose. They may be used alone or in combination.

The emulsifier is one which is used for the conventional suspension polymerization of vinyl chloride. Examples of the emulsifiers include oil-soluble emulsifiers such as sorbitan monolaurate, sorbitan trioleate, glycerin tristearate, and ethyleneoxide-propyleneoxide block copolymers; and water-soluble emulsifiers such as polyoxyethylene sorbitan monolaurate, polyoxyethylene glycerin oleate, and sodium laurate. As the emulsifier, anionic surface active agents such as sodium laurate, potassium oleate, sodium lauryl sulfate, sodium benzene sulfonate, etc., cationic surface active agents such as lauryl trimethylammonium chloride, stearyl trimethylammonium chloride, etc., nonionic surface active agents such as sorbitan monolaurate, sorbitan trioleate, glycerin tristearate, ethyleneoxide propylene oxide block copolymer, polyoxyethylene sorbitan monolaurate, polyoxyethylene glycerin oleate, etc., and amphoteric surface active agents are also used. They may be used alone or in combination.

The aqueous dispersion of the polyfunctional monomer is obtained by preparing an aqueous solution of at least one member selected from the group consisting of the water-soluble partially saponified polyvinyl alcohols, water-soluble cellulose eters and emulsifiers, and then dispersing the polyfunctional monomer into the aqueous solution. In this case, the concentration of the water-soluble partially saponified polyvinyl alcohol in the aqueous dispersion should be 0.0001 to 70% by weight, preferable 0.01 to 20% by weight. The concentration of the water-soluble cellulose eters in the aqueous dispersion should be 0.0001 to 70% by weight, preferably 0.01 to 20% by weight. The concentration of the emulsifier in the aqueous dispersion should be 0.0001 to 30% by weight, preferably 0.001 to 10% by weight. When two or more of the water-soluble partially saponified polyvinyl alcohol, water-soluble cellulose eter and emulsifier are combinedly used, the total amount should be 0.0001 to 70% by weight, preferably 0.001 to 20% by weight, although the upper limit concentration of the emulsifier may be 30% by weight. With a concentration lower than 0.0001% by weight, the aqueous solution is poor in ability to disperse the polyfunctional monomer stably. With a concentration higher than 70% by weight, the viscosity of the aqueous dispersion becomes too high and may have an adverse effect on the suspension polymerization of vinyl chloride. Further, the use of the dispersing agent in a larger amount is uneconomical. With a concentration higher than 30% by weight of the emulsifier may deteriorate the heat stability of the obtained vinyl chloride polymer for matted molding.

The aqueous dispersion of a polyfunctional monomer into an aqueous solution which is prepared by dissolving at least one member selected from the water-soluble partially saponified polyvinyl alcohols, water-soluble cellulose eters and emulsifiers in water may be accomplished by homogenizing or mixing the polyfunctional monomer as such or in the form of a solution of a desired concentration (preferably 5 to 15% by weight) in an adequate solvent. The solvent may be an organic solvent or mixtures thereof. Examples of the organic solvent include alcohols having 1 to 5 carbon atoms such as methanol, ethanol, propanol, 1-butanol, 2-butanol, 2-methyl-1-propanol, 2-methyl-2-propanol, 3-methyl-1-butanol, 2-methyl-2-butanol, isopropanol, 2-pentanol and the like; ketones having 3 to 6 carbon atoms such as acetone, methyl ethyl ketone, methyl isobuthyl ketone and the like; esters having 2 to 6 carbon atoms such as methyl formate, ethyl formate, methyl acetate, n-buthyl acetate, ethyl acetoacetate and the like; ethers such as 4-methyl-1,3-dioxolan, ethylene glycol diethylether and the like; furans such as furan, dimethylfuran and the like; dimethylformamide; dimethyl sulfoxide; acetonitrile; and derivatives thereof.

The concentration of the polyfunctional monomer in the dispersion should be 10 to 90% by weight, preferably 30 to 80% by weight. With a concentration lower than 10% by weight, the dispersion of the polyfunctional monomer is uneconomically voluminous (requiring the installation of a large tank). With a concentration higher than 90% by weight, the dispersion of the polyfunctional monomer is too viscous for pumping. The dispersion prepared in this manner should be stirred occasionally to ensure uniform dispersion after preparation and before addition.

It is essential to uniformly disperse the polyfunctional monomer into the aqueous solution in which the water-soluble partially saponified polyvinyl alcohol, water-soluble cellulose eter or emulsifier is dissolved. The dispertion is a kind of oil-in-water (O/W) type dispersion in which the aqueous solution is the continuous phase and the polyfunctional monomer is the discontinuous phase. It is preferably that an average particle size of the polyfunctional monomer dispersed in the O/W type dispersion is 20 $\mu$m or less, more preferably 5 $\mu$m or less. The lower limit of the average particle size may be generally 0.01 $\mu$m.

The polyfunctional monomer used in the present invention is a compound having 2 or more ethylenic double bonds in the molecule. Examples of such a compound are listed below.

(a) Diallyl esters of phthalic acid, such as diallyl isophthalate and diallyl terephthalate.

(b) Dially esters and diviny esters of an ethylenically unsaturated dibasic acid, such as diallyl maleate, diallyl fumarate, diallyl itaconate, divinyl itaconate, and divinyl fumarate.

(c) Diallyl esters and divinyl esters of a saturated dibasic acid, such as diallyl adipate, divinyl adipate, diallyl azelate, and diallyl sebacate.

(d) Divinyl ethers such as diallyl ether, triallyl cyanurate, triallyl isocyanurate, triallyl trimellitate, ethylene glycol divinyl ether, n-butanediol divinyl ether, and octadecane divinyl ether.

(e) Vinyl esters and allyl esters of acrylic acid and methacrylic acid, such as vinyl acrylate, vinyl methacrylate, allyl acrylate, and allyl methacrylate.

(f) Diacrylic esters and dimethacrylic esters of polyhydric alcohols, such as ethylene glycol dimethacrylate, diethylene glycol dimethacrylate, triethylene glycol diacrylate, and polyethylene glycol diacrylate.

(g) Triacrylic esters and trimethacrylic esters of polyhydric alcohols, such as trimethylolpropane trimethacrylate, trimethylolethane trimethacrylate, trimethylolpropane triacrylate, trimethylolethane triacrylate, and tetramethylolmethane triacrylate.

(h) Unsaturated bond-containing low-molecular weight polymers (having a molecular weight of 500 to 3000), such as bismethacryloyloxyethylene phthalate, 1,3,5-triacryloylhexahydrotriazine, and 1,2-butadiene homopolymer.

These polyfunctional monomers may be used alone or in combination with one another.

According to the process of the present invention, the polyfunctional monomer is added in the form of a dispersion as mentioned above to the suspension system of vinyl chloride monomer or a vinyl monomer mixture composed mainly of vinyl chloride.

The polyfunctional monomer having two or more ethylenic double bonds in the molecule should be used in an amount of 0.01 to 10 parts by weight, preferably 0.1 to 3 parts by weight, for 100 parts by weight of vinyl chloride or a mixture of vinyl monomers composed mainly of vinyl chloride. With an amount less than 0.01 part, the polyfunctional monomer does not produce the matting effect as desired. With an amount in excess of 3 parts by weight, the polyfunctional monomer gives rise to a polymer which is poor in processability.

The aqueous dispersion of polyfunctional monomer may be added to the polymerization system at any time. For example, it may be added all at once before the start of polymerization; it may be added partly before the start of polymerization, with the remainder being added in portions during polymerization; or it may be added in portions or continuously during polymerization. It is desirable to add all the aqueous dispersion of polyfunctional monomer before the degree of polymerization conversion becomes 50%.

The vinyl chloride polymer for matted moldings is prepared from vinyl chloride or a mixture of vinyl chloride (more than 50 wt %) and a copolymerizable vinyl monomer (or comonomer). Examples of the comonomer include vinyl esters such as vinyl acetate and vinyl propionate; acrylic esters and methacrylic esters such as methyl acrylate and ethyl acrylate; olefins such as ethylene and propylene; maleic anhydride; acrylonitrile; styrene; vinylidene chloride; and any other monomers copolymerizable with vinyl chloride.

According to the process of the present invention, the above-mentioned monomers undergo suspension polymerization in an aqueous medium. The aqueous medium may contain dispersion agents which are commonly used for the polymerization of vinyl chloride in an aqueous medium. The above dispersing agent used for preparing the aqueous dispersion may also be used for this purpose. Examples of the dispersing agents include water-soluble celluloses such as methyl cellulose, hydroxyethyl cellulose, and hydroxypropyl methl cellulose; water-soluble partially saponified polyvinyl alcohols having a degree of saponification of 75 to 99 mole % and an average degree of polymerization of 1500 to 2700; acrylic acid polymers; water-soluble polymers such as gelatin; oil-soluble emulsifiers such as sorbitan monolaurate, sorbitan trioleate, glycerin tristearate, and ethyleneoxidepropyleneoxide block copolymers; and water-soluble emulsifiers such as polyoxyethylene sorbitan monolaurate, polyoxyethylene glycerin oleate, and sodium laurate. They may be used alone or in combination with one another.

The blending amount of the dispersing agent should preferably be in the range of 0.01 to 1 part by weight per 100 parts by weight of vinyl chloride or the mixture of vinyl monomers.

According to the process of the present invention, the polymerization may be initiated by any polymerization initiator which is comonly used for the polymerization of vinyl chloride. Examples of the polymerization initiator include percarbonate compounds such as diisopropyl peroxydicarbonate, di-2-ethylhexyl peroxydicarbonate, and diethoxyethyl peroxydicarbonate; perester compounds such as t-butyl peroxypivalate, t-hexyl peroxypivalate, t-butyl peroxyneodecanate, and α-cumyl peroxyneodecanate; peroxides such as acetylcyclohexyl sulfonyl peroxide, 2,4,4-trimethylpentyl-2-peroxyphenoxy acetate, and 3,5,5-trimethyl hexanoyl peroxide; azo compounds such as azobis-2,4-dimethylvaleronitrile and azobis (4-methoxy-2,4-dimethyl valeronitrile); and potassium persulfate, ammonium persulfate, and hydrogen peroxide. They may be used alone or in combination with one another.

The blending amount of the polymerization initiator should preferably be in the range of 0.01 to 1 part by weight per 100 parts by weight of vinyl chloride or the mixture of vinyl monomers.

The polymerization system may contain optional polymerization regulator, chain transfer agent, pH regulator, gelation improver, antistatic agent, antioxidant, and scale inhibitor, according to need.

According to the process of the present invention, the polymerization may be performed under the same conditions as the ordinary polymerization of vinyl chloride. In other words, no specific restrictions are imposed on the method of charging the polymerizer with the aqueous medium, vinyl chloride monomer, optional comonomers, dispersing agent, and polymerization initiator. The polymerization temperature is usually 20° to 80° C., which is common for the ordinary polymerization of vinyl chloride.

The vinyl chloride polymer for matted moldings should contain 5 to 90% by weight, preferably 10 to 50% by weight, of tetrahydrofuran-insoluble gel fraction, with the remainder being tetrahydrofuran-solubles. With gel fraction less than 5% by weight, the vinyl chloride polymer yields moldings with a poor matted surface. With gel fraction in excess of 90% by weight, the vinyl chloride polymer is poor in processability.

The vinyl chloride polymer for matted moldings which is obtained as mentioned above is of high quality with a minimum of fish-eyes. It may be used alone or in combination with other thermoplastic resin or rubber (such as vinyl chloride resin, polyethylene, ABS resin, urethane resin, acrylic resin, acrylonitrile-butadiene rubber (NBR), and chloroprene rubber (CR)) and an optional processing aid such as a plastisizer, to produce matted moldings, especially high-quality film and sheet.

As mentioned above, the process of the present invention prevents the formation of fish-eyes during polymerization, thereby giving rise to a high-quality vinyl chloride resin for matted moldings with a minimum of fish-eyes.

The invention will be described in more detail with reference to the following examples and comparative examples, which are not intended to restrict the scope of the invention.

EXAMPLES 1 to 4

A 130-liter stainless steel polymerizer was charged with 60 kg of deionized water, 30 g of water-soluble partially saponified polyvinyl alcohol having a degree of saponification of 80 mole % and an average degree of polymerization of 2000, and 15 g of di-2-ethylhexyl peroxydicarbonate.

On the other hand, an aqueous dispersion of polyfunctional monomer was prepared by mixing the aqueous solution and the polyfunctional monomer each shown in Table 1 for 5 minutes using a homogenizer. The stability of the thus obtained aqueous dispersion was evaluated by allowing the dispersion to stand at room temperature for 24 hours. The average particle size of the polyfunctional monomer in the aqueous dispertion was measured. The results are shown in Table 1.

TABLE 1

| | Aqueous dispersion | | | Average particle size of polyfunctional monomer in the dispersion (μm) |
|---|---|---|---|---|
| | Polyfunctional monomer | Aqueous solution | Stability | |
| Example 1 | Diallyl phthalate 100 g | A 100 g | No separation (stable) | 1 |
| Example 2 | 1,6-hexane glycol | A 100 g | No separation | 10 |

TABLE 1-continued

| | Aqueous dispersion | | | Average particle size of polyfunctional monomer in the dispersion (μm) |
|---|---|---|---|---|
| | Polyfunctional monomer | Aqueous solution | Stability | |
| | diacrylate 150 g | | (stable) | |
| Example 3 | Diallyl phthalate 100 g | B 100 g | No separation (stable) | 2 |
| Example 4 | Diallyl phthalate 100 g | C 100 g | No separation (stable) | 0.5 |

Note)
A: 6% aqueous solution of partially saponified polyvinyl alcohol having a degree of saponification of 80 mol %
B: 6% hydroxypropyl methyl cellulose aqueous solution
C: 3% sorbitan monolaurate aqueous solution The polymerizer was evacuated to 100 mmHg and then charged with 30 kg of vinyl chloride monomer. The contents in the polymerizer were heated to 57° C. with stirring by supplying the jacket with hot water. Polymerization was continued at this temperature. The aqueous dispersion of the polyfunctional monomer shown in Table 1 was added at the time shown in Table 2. When the pressure in the polymerizer dropped to 6.0 kg/cm² G, the polymerization was suspended and the unreacted monomer was recovered. The polymer slurry was discharged from the polymerizer, followed by dehydration and drying. Thus there was obtained a vinyl chloride polymer.

COMPARATIVE EXAMPLE 1

The same procedure as in Examples was repeated to yield a vinyl chloride polymer, except any polyfunctional monomers are not used (Comparative Example 1), diallyl phthalate is used as such without preparing an aqueous dispersion (Comparative Example 2), or 1,6-hexane glycol diacrylate was used by dispersing it in toluene (Comparative Example 3).

The vinyl chloride polymers obtained in Examples and Comparative Examples were obtained in Examples and Comparative Examples were tested for fish-eyes, plasticizer absorption, and tetrahydrofuran-isoluble gel fraction in the following manner.

Fish-eyes

Each sample was compounded according to the following formulation.

| Vinyl chloride polymer obtained above | 100.0 parts by weight |
|---|---|
| DOP (dioctyl phthalate) | 30.0 parts by weight |
| Tribasic lead sulfate | 0.5 parts by weight |
| Lead stearate | 1.5 parts by weight |
| Titanium oxide | 0.5 parts by weight |
| Carbon black | 0.05 parts by weight |

The resulting compound (25 g) was mixed at 145° C. for 5 minutes on a 6" mixing roll, and then formed into a sheet, 10 cm wide and 0.2 mm thick. This sheet was examined to count the number of transparent particles per 100 cm². The counted number was used as an index of fish-eyes.

Absorption of plasticizer

Ten grams of each of the vinyl chloride polymer was allowed to stand for 1 hour in contact with 20 g of DOP. After centrifugal removal of unabsorbed DOP, the amount (wt %) of DOP absorbed by the vinyl chloride polymer was calculated.

Tetrahydrofuran-insoluble gel fraction

The vinyl chloride polymer (1 g) was dissolved with stirring in 100 ml of tetrahydrofuran (THF) at 60° C. The resulting solution was allowed to stand for 24 hours, and the supernatant liquid (10 ml) was collected. After evaporation to dryness, the residue (polymer) was weighed, and the amount of THF-insoluble gel fraction was calculated according to the following formula.

THF — insoluble gel fraction (wt %) =

$$100 - \frac{\text{Residue (g)} \times 10}{1 \text{ (g)}} \times 100$$

The results are shown in Table 2 and 3.

TABLE 2

| | Aqueous dispersion | | Time of addition (Degree of polymerization conversion) | Fish-eyes | Plasticizer absorbed (wt %) | THF-insoluble gel (wt %) |
|---|---|---|---|---|---|---|
| | Polyfunctional monomer | Aqueous solution | | | | |
| Example 1 | Diallyl phthalate | A | After 1 Hr (10%) | 1 | 21.0 | 16 |
| Example 2 | 1,6-hexane glycol diacrylate | A | After 2 Hrs (20%) | 2 | 21.2 | 20 |
| Example 3 | Diallyl phthalate | B | After 1 Hr (10%) | 1 | 22.3 | 17 |
| Example 4 | Diallyl phthalate | C | After 1 Hr (10%) | 1 | 22.5 | 18 |

Note)
A: 6% aqueous solution of partially saponified polyvinyl alcohol having a degree of saponification of 80 mol %
B: 6% hydroxypropyl methyl cellulose aqueous solution
C: 3% sorbitan monolaurate aqueous solution

TABLE 3

| | Polyfunctional monomer | Solvent | Time of addition (Degree of polymerization conversion) | Fish-eyes | Plasticizer absorbed (wt %) | THF-insoluble gel (wt %) |
|---|---|---|---|---|---|---|
| Comparative Example 1 | — | — | — | 5 | 23.5 | — |
| Comparative Example 2 | Diallyl phthalate 100 g | — | After 1 Hr) (10%) | 9 | 23.4 | 17 |
| Comparative Example 3 | 1,6-hexane glycol diacrylate 150 g | Toluene 100 g | After 2 Hrs (20%) | 8 | 23.2 | 21 |

What is claimed is:

1. In a process with the production of a vinyl chloride polymer for matted moldings wherein an aqueous medium of vinyl chloride monomer or a mixture of vinyl monomers composed mainly of vinyl chloride is subjected to polymerization conditions, said aqueous medium containing a dispersing agent selected from the group consisting of water-soluble celluloses, water-soluble partially saponified polyvinyl alcohols, acrylic acid polymers, gelatin, oil-soluble emulsifiers and water-soluble emulsifiers, the improvement which comprises preparing, separately from the aqueous medium an aqueous dispersion by dispersing a polyfunctional monomer having 2 or more ethylenic double bonds in the molecule in an aqueous solution of at least one member selected from the group consisting of water-soluble partially saponified polyvinyl alcohols, water-soluble cellulose ethers and emulsifiers, and adding said aqueous dispersion to said aqueous medium to perform a suspension polymerization wherein said polymerization yields a vinyl chloride polymer having from 5 to 90% by weight of a tetrahydrofuran-insoluble gel fraction with the remainder being a tetrahydrofuran-soluble fraction.

2. The process of claim 1 wherein the amount of the member selected from the group consisting of water-soluble partially saponified polyvinyl alcohols, water-soluble cellulose ethers and emulsifiers in the dispersion is in the range of 0.0001 to 70% by weight.

3. The process of claim 1 wherein the amount of the polyfunctional monomer in the dispersion is in the range of 10 to 90% by weight.

4. The process of claim 1 wherein the polyfunctional monomer is used in an amount of 0.1 to 3 parts by weight for 100 parts by weight of said vinyl chloride monomer or mixture of vinyl monomers.

* * * * *